(12) United States Patent
Banatwala et al.

(10) Patent No.: US 10,178,061 B2
(45) Date of Patent: *Jan. 8, 2019

(54) DIGEST FILTERING SYSTEM AND METHOD

(71) Applicant: International Business Machines Corporation, Armonk, NY (US)

(72) Inventors: Mustansir Banatwala, Hudson, NH (US); David A. Brooks, Providence, RI (US); Joseph A. Russo, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,914

(22) Filed: Apr. 6, 2018

(65) Prior Publication Data

US 2018/0227257 A1 Aug. 9, 2018

Related U.S. Application Data

(63) Continuation of application No. 14/082,311, filed on Nov. 18, 2013, now Pat. No. 10,063,503, which is a continuation of application No. 13/799,347, filed on Mar. 13, 2013, now Pat. No. 10,033,675.

(51) Int. Cl.
*G06F 15/16* (2006.01)
*H04L 12/58* (2006.01)

(52) U.S. Cl.
CPC ............ *H04L 51/12* (2013.01); *H04L 51/063* (2013.01)

(58) Field of Classification Search
CPC ......... H04L 51/12; H04L 51/32; H04L 51/34; H04W 12/02; H04W 12/06; H04W 12/12; H04W 12/10; G06Q 10/07; G06Q 10/10; G06F 21/57; G06F 21/71
USPC .................................................. 709/206, 202
See application file for complete search history.

(56) References Cited

U.S. PATENT DOCUMENTS

| 8,621,012 | B2 | 12/2013 | Jackson et al. |
| 2004/0064515 | A1 | 4/2004 | Hockey |
| 2009/0248806 | A1* | 10/2009 | Teman .................. G06Q 30/02 709/206 |
| 2011/0047222 | A1 | 2/2011 | Farrell et al. |

(Continued)

OTHER PUBLICATIONS

IBM Document, Appendix P, References to be Treated as Related, Dated Apr. 6, 2018, pp. 1-2.

*Primary Examiner* — Larry D Donaghue
*Assistant Examiner* — Patrick F Ngankam
(74) *Attorney, Agent, or Firm* — Brian J. Colandreo, Esq.; Jeffrey T. Placker, Esq.; Holland & Knight LLP

(57) ABSTRACT

A method, computer program product, and computer system for sending, from a first computing device, an email digest in an email message to a second computing device at a first point in time, wherein the email digest includes one or more content items for display at the second computing device when the email digest in the email message is accessed. An action is determined to be performed on a content item of the one or more content items at a second point in time that is after the first point in time. The content item of the one or more content items in the email digest is filtered from the email message based upon, at least in part, determining that the action is performed on the content item of the one or more content items at the second point in time.

18 Claims, 7 Drawing Sheets

(56) References Cited

U.S. PATENT DOCUMENTS

| | | |
|---|---|---|
| 2011/0185024 A1 | 7/2011 | Ramarao et al. |
| 2012/0240243 A1 | 9/2012 | Allardyce |
| 2014/0115066 A1 | 4/2014 | Massand |
| 2014/0164526 A1 | 6/2014 | Wu et al. |
| 2014/0280611 A1 | 9/2014 | Banatwala et al. |
| 2014/0280643 A1 | 9/2014 | Banatwala et al. |

* cited by examiner

At Time T₀

```
Your Daily Updates for
    March 15, 2013

Comments on My Contributions (3 new comments and replies)                                    View All
-User 48 shared the file vacationphoto.jpg with you (March 14, 2013)

-User 50 invited you to their Connections network contacts list  (March 14, 2013)
  I'd like to add you to my Connections network contacts list -User 52 invited you to their Connections network contacts list  (March 13, 2013)
  I'd like to add you to my Connections network contacts list Updates for the files I follow (2 new updates)                                               View All
-User 48 shared the file vacationphoto.jpg with user 50 (March 14, 2013)

-User 50 shared the file vacationphoto.jpg with user 52 (March 13, 2013)

Updates related to the tags I follow (3 new stories)                                         View All
-User 50 status update for #connections (March 14, 2013)

-User 52 #Connections (March 13, 2013)

-User 52 #Connections (March 12, 2013)

Updates from my network of people (more than 3 updates)                                      View All
-User 48 commented on User 50's board entry (March 14, 2013)
  this needs more blues -User 50 commented on User 52's board entry (March 14, 2013)
  very nice!

-User 52 recommended User 48's board entry (March 12, 2013)
```

At (or After) Time T₁

---

Your Daily Updates for
March 15, 2013

Comments on My Contributions (2 new comments and replies)               View All
-User 48 shared the file vacationphoto.jpg with you (March 14, 2013)

-User 52 invited you to their Connections network contacts list (March 13, 2013)
  I'd like to add you to my Connections network contacts list Updates for the files I follow (2 new updates)                          View All
-User 48 shared the file vacationphoto.jpg with user 50 (March 14, 2013)

-User 50 shared the file vacationphoto.jpg with user 52 (March 13, 2013)

Updates related to the tags I follow (3 new stories)                    View All
-User 50 status update for #connections (March 14, 2013)

-User 52 #Connections (March 13, 2013)

-User 52 #Connections (March 12, 2013)

Updates from my network of people (more than 3 updates)                 View All
-User 48 commented on User 50's board entry (March 14, 2013)
  this needs more blues -User 50 commented on User 52's board entry (March 14, 2013)
  very nice!

-User 52 recommended User 48's board entry (March 12, 2013)

At (or After) Time T₁

400

Your Daily Updates for
March 15, 2013

Comments on My Contributions (2 new comments and replies)     View All
- User 48 shared the file vacationphoto.jpg with you (March 14, 2013)
- ~~User 50 invited you to their Connections network contacts list (March 14, 2013)~~
   ~~I'd like to add you to my Connections network contacts list~~
- User 52 invited you to their Connections network contacts list (March 13, 2013)
   I'd like to add you to my Connections network contacts list Updates for the files I follow (2 new updates)     View All
- User 48 shared the file vacationphoto.jpg with user 50 (March 14, 2013)
- User 50 shared the file vacationphoto.jpg with user 52 (March 13, 2013)

Updates related to the tags I follow (3 new stories)     View All
- User 50 status update for #connections (March 14, 2013)
- User 52 #Connections (March 13, 2013)
- User 52 #Connections (March 12, 2013)

Updates from my network of people (more than 3 updates)     View All
- User 48 commented on User 50's board entry (March 14, 2013)
   this needs more blues
- User 50 commented on User 52's board entry (March 14, 2013)
   very nice!
- User 52 recommended User 48's board entry (March 12, 2013)

FIG. 6

DIGEST FILTERING SYSTEM AND METHOD

RELATED APPLICATIONS

The subject application is a continuation application of U.S. patent application Ser. No. 14/082,311, filed on Nov. 18, 2013, which is a continuation application of U.S. patent application Ser. No. 13/799,347 filed on Mar. 13, 2013, the entire contents of which are herein incorporated by reference.

BACKGROUND

Applications, such as collaborative and/or social product suite applications, may leverage the use of email digests to help inform the end user about activities that the end user may have declared interest in based upon, e.g., a contribution to a forum made by the end user, a tag applied to web content by the end user, a community container, updates to a specific item, etc. The email digest may include an email sent to the end user after a defined time window (e.g., daily, weekly, etc.) that includes a notification displaying activity associated with the declared interest of the end user that has occurred since the last email digest was received. Depending on things such as the amount of declared interests, the content of each email digest may include a substantial amount of activity that may be cumbersome for the end user to look through each time an email digest is received.

BRIEF SUMMARY OF DISCLOSURE

In one implementation, a method, performed by one or more computing devices, comprises sending, from a first computing device, an email digest in an email message to a second computing device at a first point in time, wherein the email digest includes one or more content items for display at the second computing device when the email digest in the email message is accessed. An action is determined to be performed on a content item of the one or more content items at a second point in time that is after the first point in time. The content item of the one or more content items in the email digest is filtered from the email message based upon, at least in part, determining that the action is performed on the content item of the one or more content items at the second point in time.

One or more of the following features may be included. Filtering the content item of the one or more content items in the email digest from the email message may include excluding display of the content item at the second computing device. Filtering the content item of the one or more content items in the email digest from the email message may include annotating the content item in the email digest. The email message may include an alternate mime part to render an embedded application. The content item of the one or more content items may include at least one of a blog entry and a forum post. The action may include at least one of viewing the content item of the one or more content items and downloading the content item of the one or more content items. The email digest may include an option to unfilter the content item of the one or more content items in the email digest from the email message.

In another implementation, a computing system includes a processor and a memory configured to perform operations comprising sending to a computing device an email digest in an email message at a first point in time, wherein the email digest includes one or more content items for display at the computing device when the email digest in the email message is accessed. An action is determined to be performed on a content item of the one or more content items at a second point in time that is after the first point in time. The content item of the one or more content items in the email digest is filtered from the email message based upon, at least in part, determining that the action is performed on the content item of the one or more content items at the second point in time.

One or more of the following features may be included. Filtering the content item of the one or more content items in the email digest from the email message may include excluding display of the content item at the computing device. Filtering the content item of the one or more content items in the email digest from the email message may include annotating the content item in the email digest. The email message may include an alternate mime part to render an embedded application. The content item of the one or more content items may include at least one of a blog entry and a forum post. The action may include at least one of viewing the content item of the one or more content items and downloading the content item of the one or more content items. The email digest may include an option to unfilter the content item of the one or more content items in the email digest from the email message.

In another implementation, a computer program product resides on a computer readable storage medium that has a plurality of instructions stored on it. When executed by a processor, the instructions cause the processor to perform operations comprising sending to a computing device an email digest in an email message at a first point in time, wherein the email digest includes one or more content items for display at the computing device when the email digest in the email message is accessed. An action is determined to be performed on a content item of the one or more content items at a second point in time that is after the first point in time. The content item of the one or more content items in the email digest is filtered from the email message based upon, at least in part, determining that the action is performed on the content item of the one or more content items at the second point in time.

One or more of the following features may be included. Filtering the content item of the one or more content items in the email digest from the email message may include excluding display of the content item at the computing device. Filtering the content item of the one or more content items in the email digest from the email message may include annotating the content item in the email digest. The email message may include an alternate mime part to render an embedded application. The content item of the one or more content items may include at least one of a blog entry and a forum post. The action may include at least one of viewing the content item of the one or more content items and downloading the content item of the one or more content items. The email digest may include an option to unfilter the content item of the one or more content items in the email digest from the email message.

The details of one or more implementations are set forth in the accompanying drawings and the description below. Other features and advantages will become apparent from the description, the drawings, and the claims.

BRIEF DESCRIPTION OF THE DRAWINGS

FIG. 4 is an illustrative diagrammatic view of a screen image displayed by the filter process of FIG. 1 according to one or more implementations of the present disclosure;

FIG. 5 is an illustrative diagrammatic view of a screen image displayed by the filter process of FIG. 1 according to one or more implementations of the present disclosure;

FIG. 6 is an illustrative diagrammatic view of a screen image displayed by the filter process of FIG. 1 according to one or more implementations of the present disclosure.

Like reference symbols in the various drawings indicate like elements.

DETAILED DESCRIPTION

Figure 1:
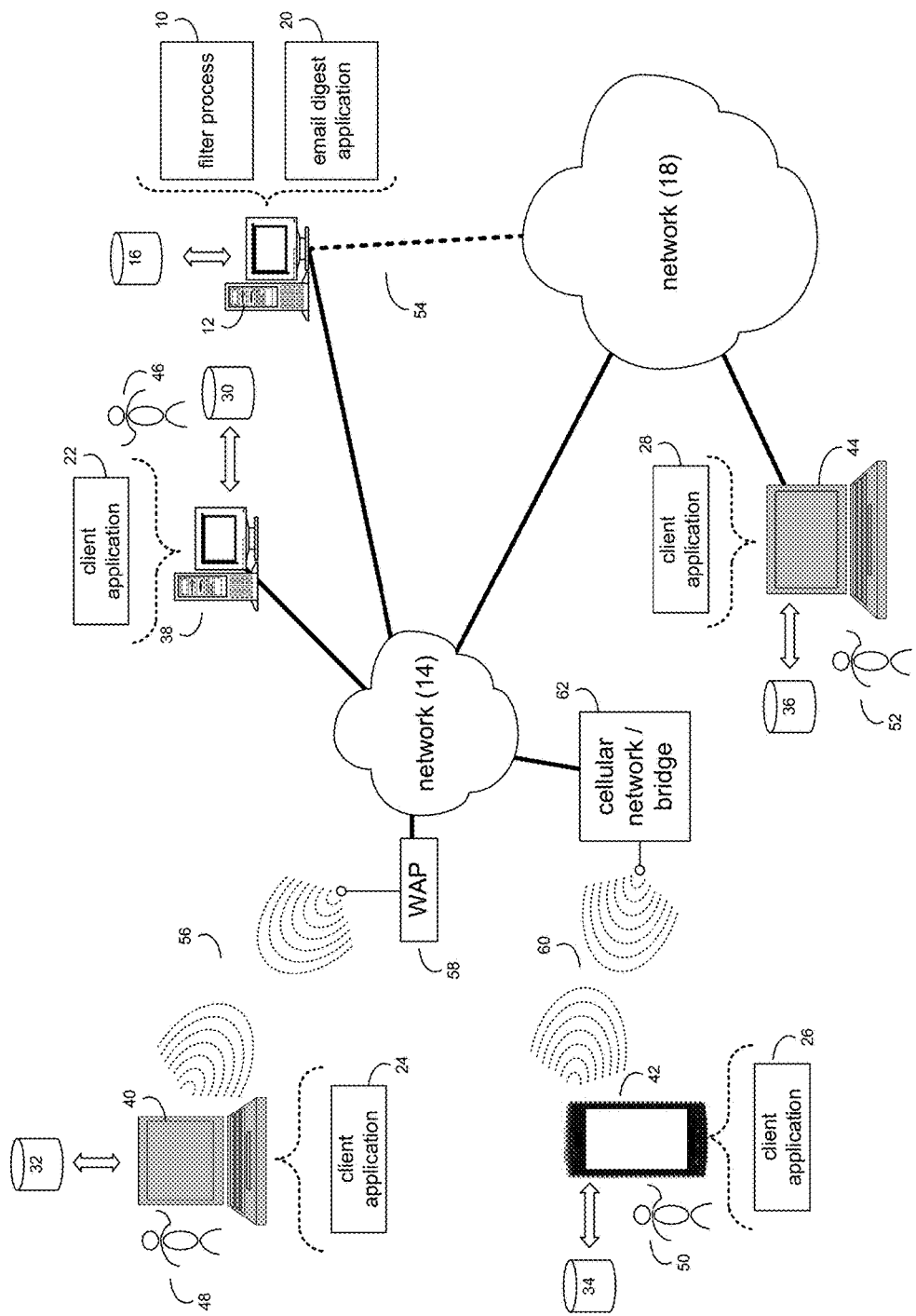
FIG. 1 is an illustrative diagrammatic view of a filter process coupled to a distributed computing network according to one or more implementations of the present disclosure.

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown filter process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, filter process 10 may send, from a first computing device, an email digest in an email message to a second computing device at a first point in time, wherein the email digest may include one or more content items for display at the second computing device when the email digest in the email message is accessed. An action may be determined to have been performed on a content item of the one or more content items at a second point in time that is after the first point in time. The content item of the one or more content items in the email digest may be filtered from the email message based upon, at least in part, determining that the action is performed on the content item of the one or more content items at the second point in time.

The instruction sets and subroutines of filter process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, etc.) and may be located within any suitable memory location, such as storage device 16 coupled to computer 12. Any data described throughout may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Filter process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute an email digest application (e.g., email digest application 20), examples of which may include, but are not limited to, e.g., an electronic mailing list application, a collaborative application, a social product suite application, email application, or other application that allows for providing email digests based upon, e.g., actions performed on online content. Filter process 10 and/or email digest application 20 may be accessed via client applications 22, 24, 26, 28. Filter process 10 may be a stand alone application, or may be an applet/application/script that may interact with and/or be executed within email digest application 20 and/or one or more of client applications 22, 24, 26, 28. Email digest application 20 may be a stand alone application, or may be an applet/application/script that may interact with and/or be executed within filter process 10 and/or one or more of client applications 22, 24, 26, 28. One or more of client applications 22, 24, 26, 28 may be a stand alone application, or may be an applet/application/script that may interact with and/or be executed within filter process 10 and/or email digest application 20. Examples of client applications 22, 24, 26, 28 may include, but are not limited to, e.g., an electronic mailing list application, a collaborative application, a social product suite application, email application, or other application that allows for providing email digests based upon, e.g., actions performed on online content, a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of filter process 10 (and vice versa). Accordingly, filter process 10 may be a purely server-side application, a purely client-side application, or a hybrid server-side/client-side application that is cooperatively executed by one or more of client applications 22, 24, 26, 28 and/or filter process 10.

One or more of client applications 22, 24, 26, 28 may be configured to effectuate some or all of the functionality of email digest application 20 (and vice versa). Accordingly, email digest application 20 may be a purely server-side application, a purely client-side application, or a hybrid server-side/client-side application that is cooperatively executed by one or more of client applications 22, 24, 26, 28 and/or email digest application 20. As one or more of client applications 22, 24, 26, 28, filter process 10, and email digest application 20, taken singly or in any combination, may effectuate some or all of the same functionality, any description of effectuating such functionality via one or more of client applications 22, 24, 26, 28, filter process 10, email digest application 20, or combination thereof, and any described interaction(s) between one or more of client applications 22, 24, 26, 28, filter process 10, email digest application 20, or combination thereof to effectuate such functionality, should be taken as an example only and not to limit the scope of the disclosure.

Users 46, 48, 50, 52 may access computer 12 and filter process 10 (e.g., using one or more of client electronic devices 38, 40, 42, 44) directly through network 14 or through secondary network 18. Further, computer 12 may be connected to network 14 through secondary network 18, as illustrated with phantom link line 54. Filter process 10 may include one or more user interfaces, such as browsers and textual or graphical user interfaces, through which users 46, 48, 50, 52 may access filter process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
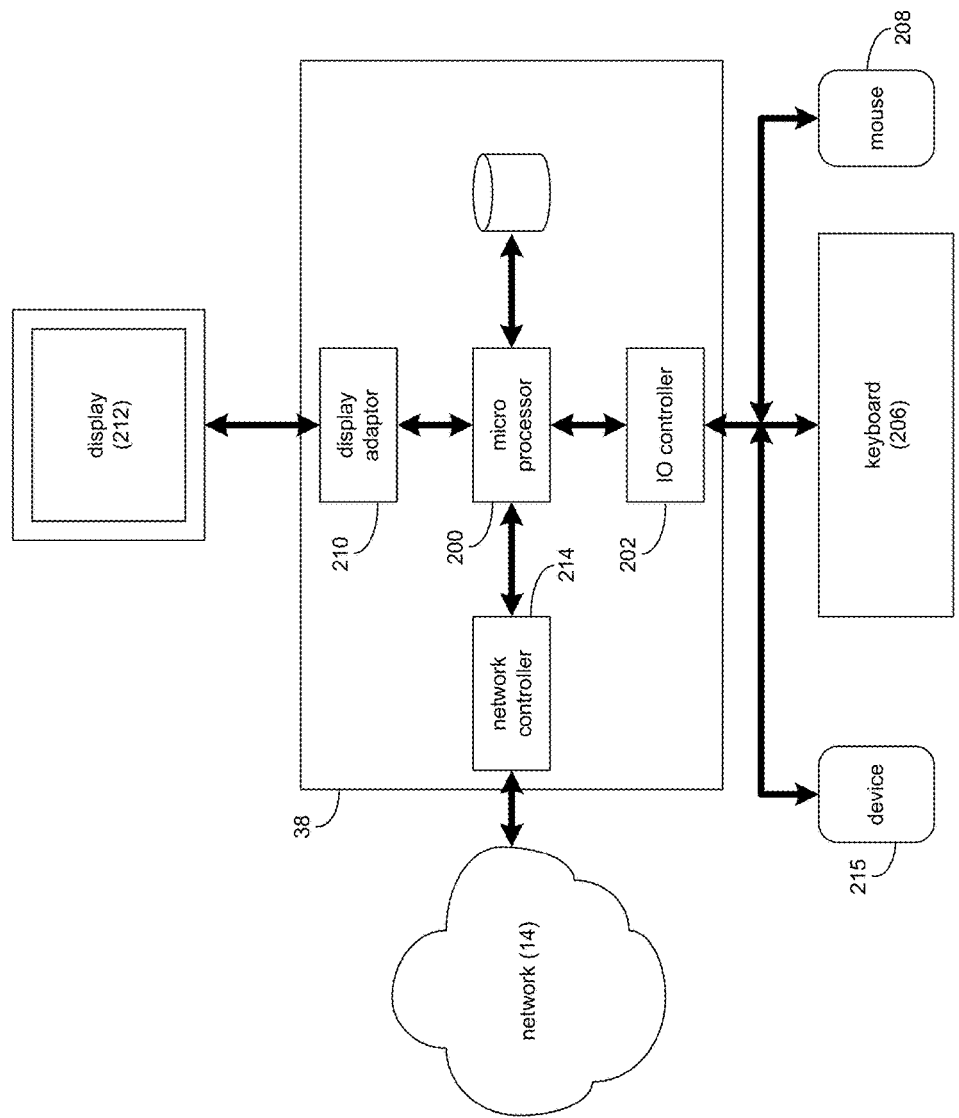
FIG. 2 is a diagrammatic view of a client electronic device of FIG. 1 according to one or more implementations of the present disclosure.
Figure 3:
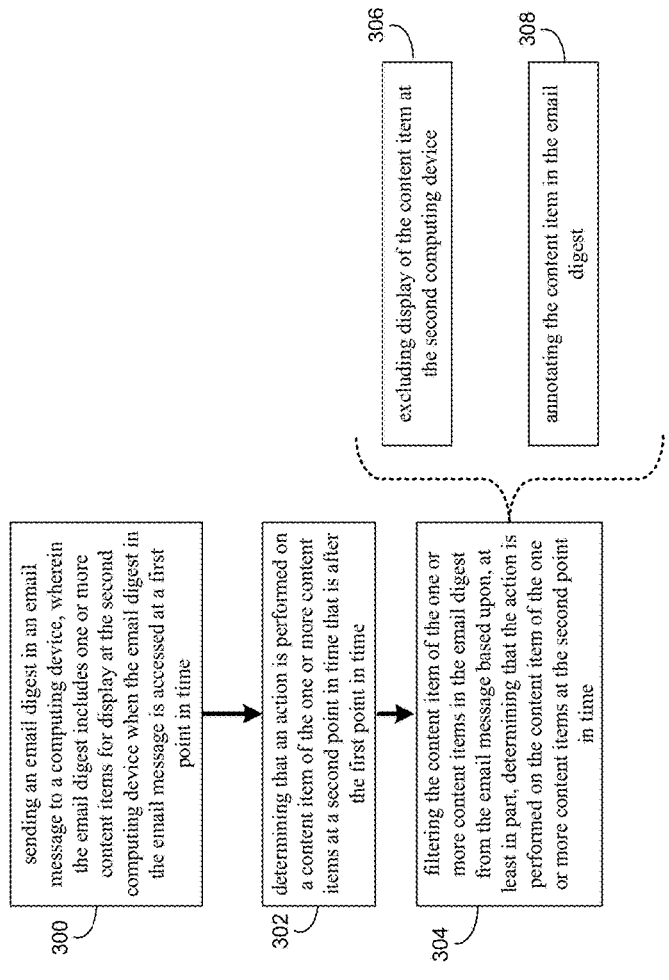
FIG. 3 is an illustrative flowchart of the filter process of FIG. 1 according to one or more implementations of the present disclosure.
Figure 7:
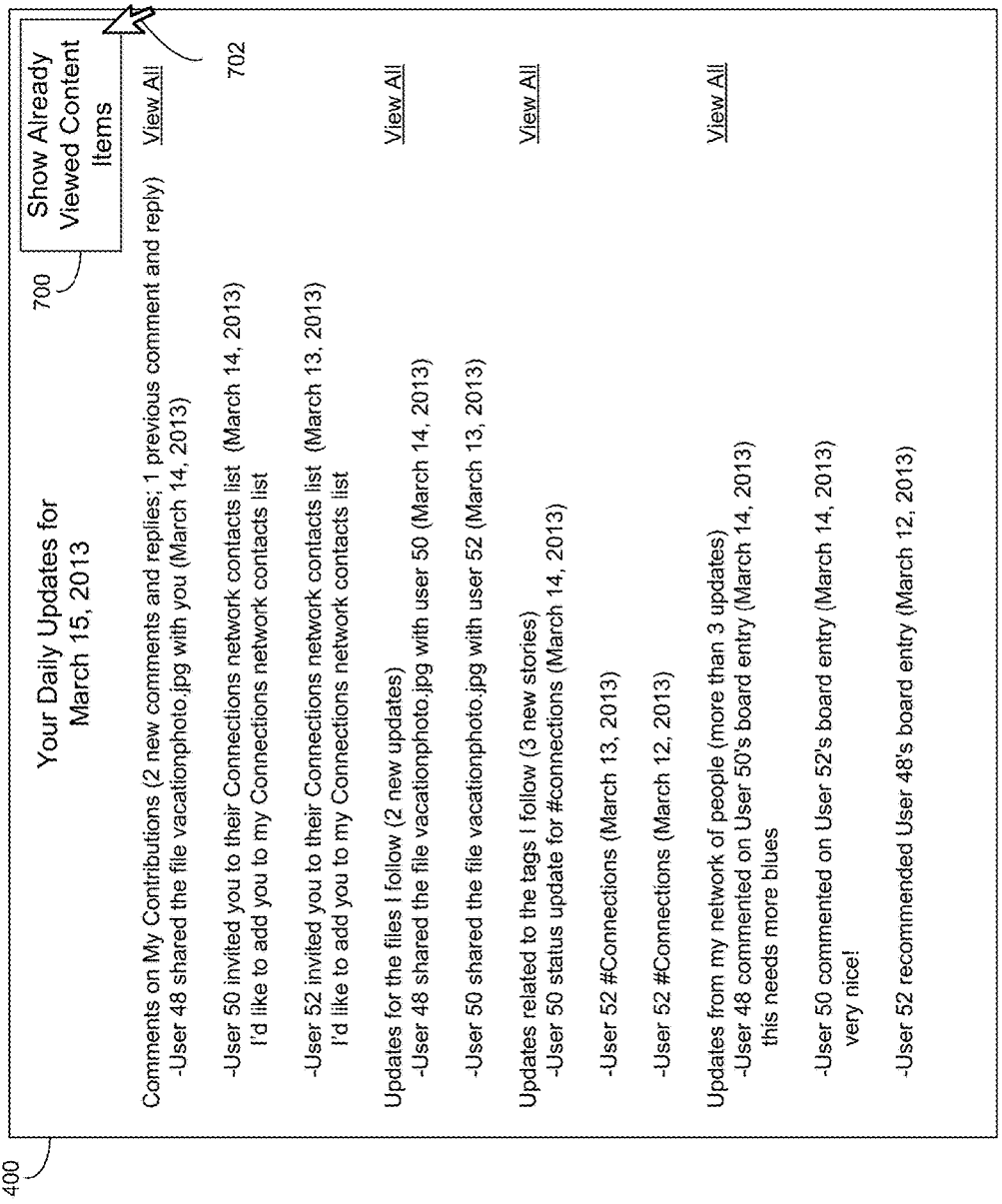
FIG. 7 is an illustrative diagrammatic view of a screen image displayed by the filter process of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, filter process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Filter Process:

As discussed above and referring also to FIGS. 3-7, filter process 10 may send 300, from a first computing device, an email digest in an email message to a second computing device at a first point in time, wherein the email digest may include one or more content items for display at the second computing device when the email digest in the email message is accessed. Filter process 10 may determine 302 that an action is performed on a content item of the one or more content items at a second point in time that is after the first point in time. The content item of the one or more content items in the email digest may be filtered 304 from the email message by filter process 10 based upon, at least in part, determining that the action is performed on the content item of the one or more content items at the second point in time.

In some implementations, filter process 10 may send 300, from a first computing device, an email digest in an email message to a second computing device at a first point in time, wherein the email digest may include one or more content items for display at the second computing device when the email digest in the email message is accessed. For instance, assume for example purposes only that user 46 is a contributor to one or more online discussions (e.g., in forums, blogs, social media websites, etc.). For example, user 46 may (e.g., via client electronic device 38) post a comment for other users to view and/or comment on in the online forum, where user 46 may also view and/or comment on posts provided by other users. Additionally, user 46 may (e.g., via client electronic device 38) opt to receive updates to the forum and/or individual forum posts, as well as other items. Referring at least to FIG. 4, an example email digest (e.g., email digest 400) of an activity stream sent by filter process 10 (e.g., via email digest application 20) to user 46 (e.g., via client application 26) is shown (e.g., after user 46 has opened or otherwise accessed email digest 400 via client application 26). In the example, filter process 10 may have sent 300 email digest 400 to user 46 at time $T_0$. For instance, at time $T_0$, email digest may include one or more content items associated with what user 46 has opted to follow.

For example, the content item of the one or more content items may include at least one of a blog entry and a forum post. For instance, assume for example purposes only that user 46 has opted to follow "Updates from my network of people", where updates from those in the network of user 46 (e.g., user 48, user 50, user 52, etc.) may be included in email digest 400. In the example, one of the content items included in email digest 400 may be a blog entry or forum post from user 48 commenting on a blog entry or forum post by user 50 (e.g., "this needs more blues"). As another example, one of the content items included in email digest 400 may be a blog entry or forum post from user 50 commenting on a blog entry or forum post by user 52 (e.g., "very nice!"). Other examples of content items may include but are not limited to notifications of files being shared by users, notifications of receiving an invitation to connect to a contacts list, status updates (e.g., for tag words), comments posted by users followed by user 46, or other activities posted by users followed by user 46.

In some implementations, filter process 10 may determine 302 that an action is performed on a content item of the one or more content items at a second point in time that is after the first point in time. For instance, assume for example purposes only that at time $T_1$ (e.g., after email digest 400 has been sent 300 and/or received by user 46), an action is performed on one of the content items originally included in email digest 400 at time $T_0$. In some implementations, the action may include at least one of viewing the content item of the one or more content items and downloading the content item of the one or more content items. For instance, further assume that one of the content items originally included in email digest 400 at time $T_0$ includes the blog entry or forum post from user 50 commenting on a blog entry or forum post by user 52 (e.g., "very nice!"). In the example, the action performed at time $T_1$ may include user 46 viewing the blog entry or forum post by user 52 (e.g., "very nice!"), where it may have been viewed by user 46, e.g., when visiting the website hosting the blog entry or forum post. As another example, further assume that one of the content items originally included in email digest 400 at time $T_0$ includes the notification that user 48 has shared the file vacationphoto.jpg with user 46. In the example, the action performed at time $T_1$ may include user 46 downloading the file vacationphoto.jpg shared by user 48, where it may have been downloaded by user 46, e.g., when visiting the website hosting the shared file. Other examples of actions that may be performed on content items may also be used without departing from the scope of the disclosure. For instance, further assume that one of the content items originally included in email digest 400 at time $T_0$ includes the notification that user 50 has invited user 46 to be added to, e.g., a contact list. In the example, the action performed at time $T_1$ may include user 46 viewing and/or accepting/rejecting the invitation to be added to the contact list.

In some implementations, the email message may include an alternate mime part to render an embedded application. For instance, features such as the above-noted blog entries, forum posts, and other content items may be dynamically viewed, e.g., via client application 20, in place of a static email message. In the example, at least a portion of the email message (e.g., email digest 400) may include an alternate mime part that may include, e.g., a JSON payload or other payload type. The JSON payload may represent the metadata for an embedded application (also known as an embedded experience). An embedded application is generally part of the Open Social standard that may enable clients (e.g., email clients) to display dynamic elements instead of static email messages (e.g., via using alternate mime parts). The JSON part may describe the metadata necessary to allow the logic (javascript) to request dynamic resources it needs. This may be, e.g., a digest ID, user ID, etc. An enabled email client (e.g., client application 26) may load this embedded application in place of the static email message. In the example, filter process 10 (e.g., via email digest application 20) that may be responsible for sending 300 email digests to user 46 may send out email messages with an alternate mime part to have client application 26 load the embedded application (when supported). In the example, the embedded application (e.g., via filter process 10, email digest application 20, client application 26, or combination thereof) may dynamically request, e.g., a feed of content items on which user 46 has not performed any actions, such as unread posts, files not yet downloaded, etc. In the example, the feed of content items on which user 46 has not performed any actions may be displayed instead of the content items originally provided in email digest 400 in the email at time $T_0$.

As an example, in some implementations, the content item of the one or more content items in the email digest may be filtered 304 from the email message by filter process 10 based upon, at least in part, determining that the action is performed on the content item of the one or more content items at the second point in time. For example, filtering 304 the content item of the one or more content items in the email digest from the email message may include filter process 10 excluding 306 display of the content item at the second computing device. For instance, continue with the example where one of the content items originally included in email digest 400 at time $T_0$ includes the notification that user 50 has invited user 46 to be added to the contact list, and where user 46 has accepted the invitation to be added to the contact list at time $T_1$. In the example, the content item of user 50 inviting user 46 to be added to the contact list may be excluded 306 by filter process 10 from the same email digest 400 in the same email originally sent 300 at time $T_0$ (e.g., without requiring that another email digest in another email be sent). That is, in the example, if user 46 were to access the very same email containing email digest 400 that originally included the above-noted content item at time $T_0$, then user 46 accessing the very same email containing email digest 400 after time $T_1$ may now exclude the above-noted content item from being displayed. An example of email digest 400 in the same email sent 300 by filter process 10 at (or after) time $T_0$ where the content item on which the action was performed is excluded 306 from being displayed in email digest 400 is shown at FIG. 5.

In some implementations, filtering 304 the content item of the one or more content items in the email digest from the email message may include filter process 10 annotating 308 the content item in the email digest. For instance, continue with the example where one of the content items originally included in email digest 400 at time $T_0$ includes the notification that user 50 has invited user 46 to be added to the contact list, and where user 46 has accepted the invitation to be added to the contact list at time $T_1$. In the example, the content item of user 50 inviting user 46 to be added to the contact list may be annotated 308 by filter process 10 from the same email digest 400 in the same email originally sent 300 at time $T_0$. In the example, the content item of user 50 inviting user 46 to be added to the contact list may be annotated 308 by filter process 10 from the same email digest 400 in the same email originally sent 300 at time $T_0$ (e.g., without requiring that another email digest in another email be sent). That is, in the example, if user 46 were to access the very same email containing email digest 400 that originally included the above-noted content item at time $T_0$, then user 46 accessing the very same email containing email digest 400 after time $T_1$ may now include an annotated version of the above-noted content item. An example of email digest 400 in the same email sent 300 by filter process 10 at (or after) time $T_0$ where the content item on which the action was performed is annotated 308 in email digest 400 is shown at FIG. 6. As shown in FIG. 6, the above-noted content item is annotated 308 with strikethrough font; however, other forms of annotation, such as highlighting, underlining, italicizing, etc. may be used without departing from the scope of the disclosure.

In some implementations, the email digest may include an option to unfilter the content item of the one or more content items in the email digest from the email message. For example, and referring at least to FIG. 7, an object (e.g., object 700) associated with email digest 400 may be located, e.g., within the email or elsewhere. The object may include, for example, a dynamic link. In the example, user 46 may (e.g., via client application 26) select object 700 using, e.g., curser 702. In response to selecting object 700, filter process 10 may unfilter (e.g., display) one or more of the previously filtered 304 content items from email digest 400. In some implementations, unfiltered content items may be annotated as discussed above.

While the description includes examples of email digests, other types of digests may be used without departing from the scope of the disclosure. For example, the digests may be sent 300 to user 46 via a text message. As such, the description of an email digest should be taken as an example only and not to limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
    sending, from a first computing device, an email digest in an email message including an alternate mime part to render an embedded application to a second computing device at a first point in time, wherein the email digest includes one or more notifications associated with one or more content items for display at the second computing device when the email digest in the email message is accessed;
    determining that an action is performed on a content item of the one or more content items at a second point in time that is after the first point in time; and
    filtering the one or more notifications associated with the content item of the one or more content items in the email digest from the email message based upon, at least in part, determining that the action is performed on the content item of the one or more content items at the second point in time, wherein the email digest includes an option to unfilter the one or more notifications associated with the content item of the one or more content items in the email digest from the email message and annotate the unfiltered the one or more notifications associated with the content item of the one or more content items.

2. The computer-implemented method of claim 1 wherein filtering the one or more notifications associated with the content item of the one or more content items in the email digest from the email message includes excluding display of the one or more notifications associated with the content item at the second computing device.

3. The computer-implemented method of claim 1 wherein filtering the one or more notifications associated with the content item of the one or more content items in the email digest from the email message includes receiving a request to replace the email digest in the email message with an updated email digest in the email message.

4. The computer-implemented method of claim 1 wherein the content item of the one or more content items includes at least one of a blog entry and a forum post.

5. The computer-implemented method of claim 1 wherein the action includes at least one of viewing the content item of the one or more content items and downloading the content item of the one or more content items.

6. The computer-implemented method of claim 1 wherein the email digest includes an option to unfilter the one or more notifications associated with the content item of the one or more content items in the email digest from the email message.

7. A computing system including a processor and a memory configured to perform operations comprising:
    sending an email digest in an email message including an alternate mime part to render an embedded application to a computing device at a first point in time, wherein the email digest includes one or more notifications associated with one or more content items for display at the computing device when the email digest in the email message is accessed;
    determining that an action is performed on a content item of the one or more content items at a second point in time that is after the first point in time; and
    filtering the one or more notifications associated with the content item of the one or more content items in the email digest from the email message based upon, at least in part, determining that the action is performed on the content item of the one or more content items at the second point in time, wherein the email digest includes an option to unfilter the one or more notifications associated with the content item of the one or more content items in the email digest from the email message and annotate the unfiltered one or more notifications associated with the content item of the one or more content items.

8. The computing system of claim 7 wherein filtering the one or more notifications associated with the content item of the one or more content items in the email digest from the email message includes excluding display of the one or more notifications associated with content item at the computing device.

9. The computing system of claim 7 wherein filtering the one or more notifications associated with the content item of the one or more content items in the email digest from the email message includes annotating the one or more notifications associated with the content item in the email digest.

10. The computing system of claim 7 wherein the content item of the one or more content items includes at least one of a blog entry and a forum post.

11. The computing system of claim 7 wherein the action includes at least one of viewing the content item of the one or more content items and downloading the content item of the one or more content items.

12. The computing system of claim 7 wherein the email digest includes an option to unfilter the one or more notifications associated with the content item of the one or more content items in the email digest from the email message.

13. A computer program product residing on a non-transitory computer readable storage medium having a plurality of instructions stored thereon which, when executed by a processor, cause the processor to perform operations comprising:
sending an email digest in an email message including an alternate mime part to render an embedded application to a computing device at a first point in time, wherein the email digest includes one or more notifications associated with one or more content items for display at the computing device when the email digest in the email message is accessed;
determining that an action is performed on a content item of the one or more content items at a second point in time that is after the first point in time; and
filtering the one or more notifications associated with the content item of the one or more content items in the email digest from the email message based upon, at least in part, determining that the action is performed on the content item of the one or more content items at the second point in time, wherein the email digest includes an option to unfilter the one or more notifications associated with the content item of the one or more content items in the email digest from the email message and annotate the unfiltered one or more notifications associated with the content item of the one or more content items.

14. The computer program product of claim 13 wherein filtering the one or more notifications associated with the content item of the one or more content items in the email digest from the email message includes excluding display of the one or more notifications associated with the content item at the computing device.

15. The computer program product of claim 13 wherein filtering the one or more notifications associated with the content item of the one or more content items in the email digest from the email message includes annotating the one or more notifications associated with the content item in the email digest.

16. The computer program product of claim 13 wherein the content item of the one or more content items includes at least one of a blog entry and a forum post.

17. The computer program product of claim 13 wherein the action includes at least one of viewing the content item of the one or more content items and downloading the content item of the one or more content items.

18. The computer program product of claim 13 wherein the email digest includes an option to unfilter the one or more notifications associated with the content item of the one or more content items in the email digest from the email message.

* * * * *